July 21, 1964    B. BAXTER    3,141,649
EXTERNALLY OPERATED GATE VALVE FOR IRRIGATION CONDUITS
Filed June 12, 1961    2 Sheets-Sheet 2

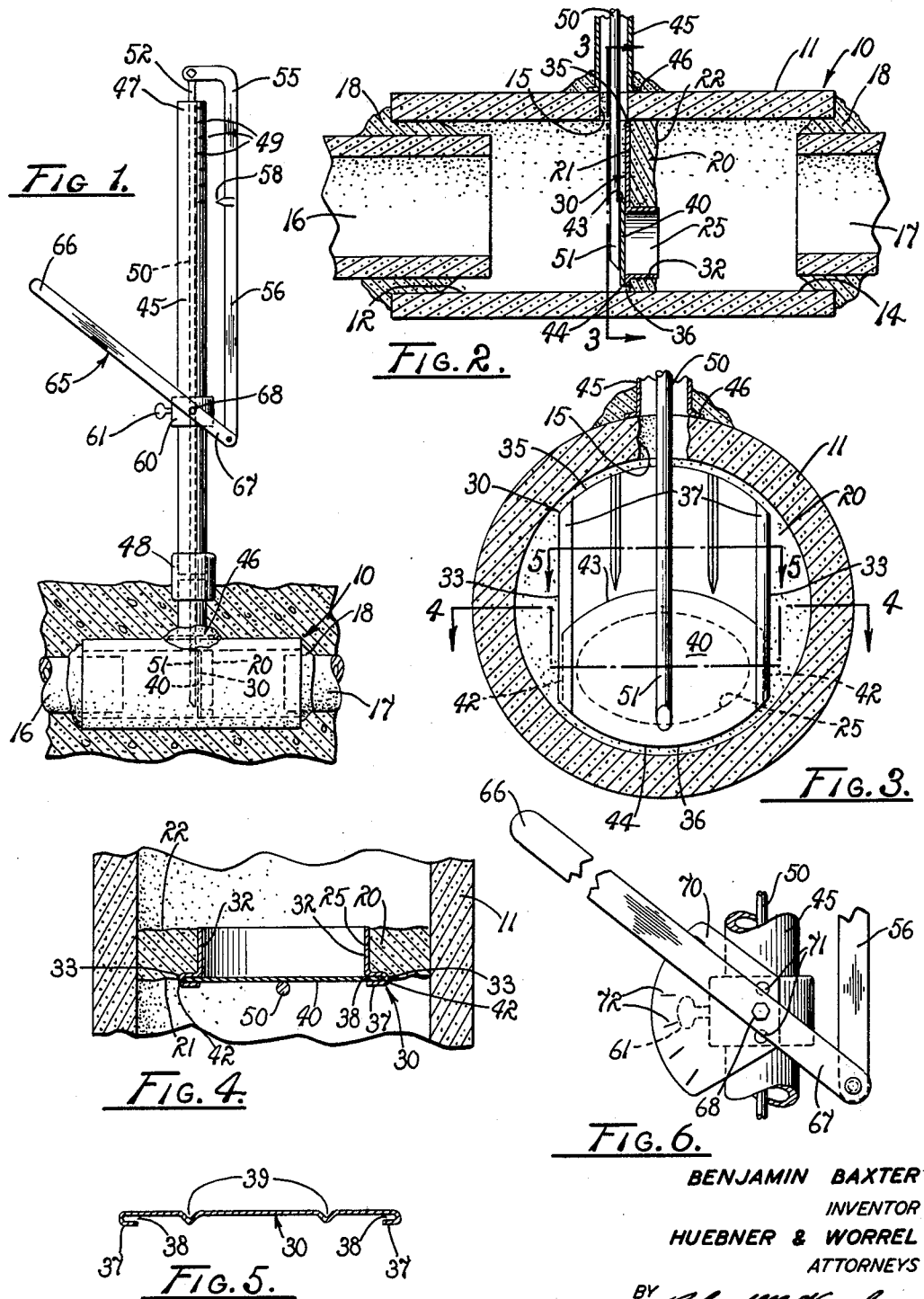

BENJAMIN BAXTER
INVENTOR
HUEBNER & WORREL
ATTORNEYS
BY Richard M. Worrel

United States Patent Office 3,141,649
Patented July 21, 1964

1

3,141,649
EXTERNALLY OPERATED GATE VALVE FOR
IRRIGATION CONDUITS
Benjamin Baxter, Box 488, Fowler, Calif.
Filed June 12, 1961, Ser. No. 116,522
3 Claims. (Cl. 251—176)

The present invention relates to a gate valve adaptable for use in irrigation conduits and more particularly to such a valve which provides a vent opening through which the valve is manipulated from a position externally thereof.

In irrigation systems it has been the practice to provide large concrete standpipes having ports and valving for controlling the flow of irrigating water to selected portions of the system. Such standpipes are usually several feet in diameter and of a height requiring the use of a ladder to manipulate the valving contained therein. The height of these standpipes is determined by the contour of the land being irrigated. They must have sufficient elevation to preclude overflow when subjected to the maximum fluid pressures in their systems. The size and cost of the conventional standpipe has in the past generally limited its use to the main supply lines in the system. With this arrangement, it has been impossible selectively to control the flow through the branch lines supplying specific outlying areas under irrigation. In most instances, the valve control mechanism which usually employs screw-threaded motivating connections or jointed levers, is immersed in the water and subject to rust, corrosion and accelerated wear due to stand and other abrasives and harmful impurities in the water. This is also true of hub end gate globe valves which are sometimes employed in such installations when cost is not a determining factor. Furthermore, the conventional standpipe devices collect debris, occupy extensive valuable space, are unsightly, and constitute hazards of recognized significance when being operated as well as when simply occupying space as an orchard or field fixture.

It is therefore an object of the present invention to provide an improved gate valve for irrigation systems and the like.

Another object is to provide such a valve for controlling the flow of fluid therein while concurrently venting the conduit to the atmosphere.

Another object is to provide a vented gate valve which is adapted for economical and expeditious installation in existing irrigation conduits as well as in new conduits under construction.

Another object is to provide a gate valve having a vent presenting a minimum opening to minimize the entry of debris into the valve.

Another object is to provide a vented gate valve which is readily adapted to any desired venting height to preclude overflow.

Another object is to provide a gate valve which can be installed in underground irrigation conduits and can be controlled from positions above the ground.

Another object is to provide a vented gate valve wherein the gate control mechanism is disposed completely out of the water.

Another object is to provide such a valve which is compact, lightweight, economically manufactured, and is safe and convenient in use.

In the drawings:

FIG. 1 is a side elevation of a vented gate valve embodying the principles of the present invention shown disposed in an underground irrigation conduit.

FIG. 2 is a somewhat enlarged longitudinal vertical section taken on a plane axially of the valve of FIG. 1.

FIG. 3 is a somewhat enlarged transverse vertical section of the valve taken on line 3—3 of FIG. 2.

2

FIG. 4 is a fragmentary horizontal section taken on line 4—4 of FIG. 3 showing a valve gate mounting member.

FIG. 5 is a horizontal section of the valve gate mounting member taken on line 5—5 of FIG. 3.

FIG. 6 is a fragmentary side elevation of second form of gate position indicator embodying the principles of the present invention.

Figure 7:
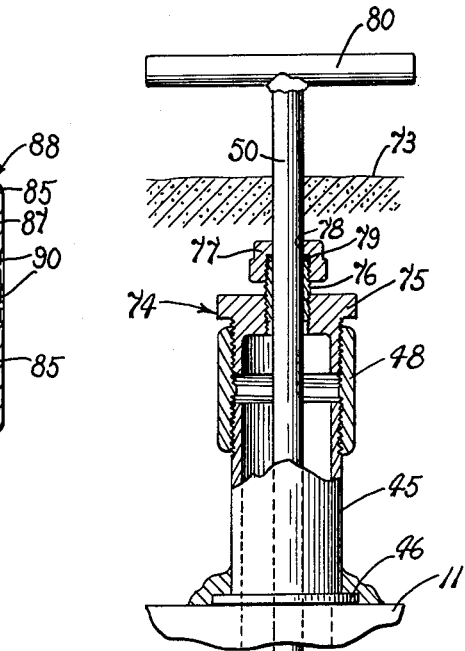

FIG. 7 is a fragmentary vertical section through a valve embodying a second form of the present invention.

Figure 8:
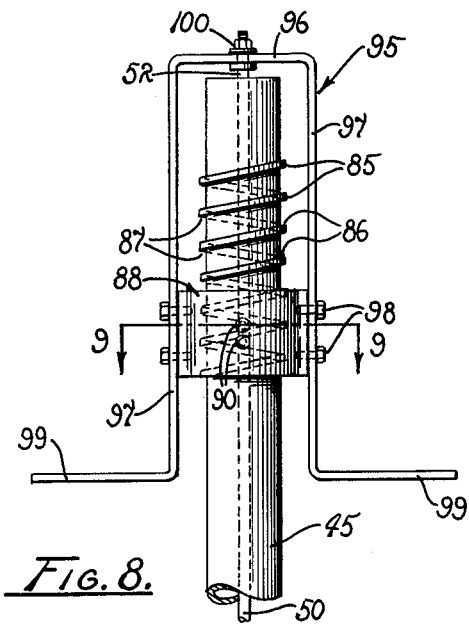

FIG. 8 is a side elevation of a second form of gate control embodying the principles of the present invention.

Figure 9:
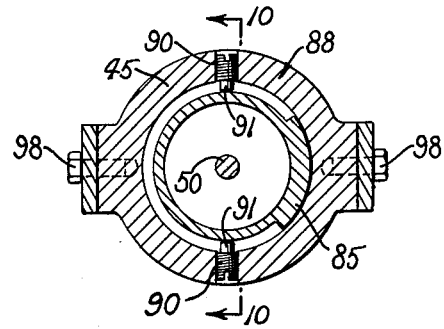

FIG. 9 is a somewhat enlarged horizontal transverse section taken on lines 9—9 of FIG. 8.

Figure 10:
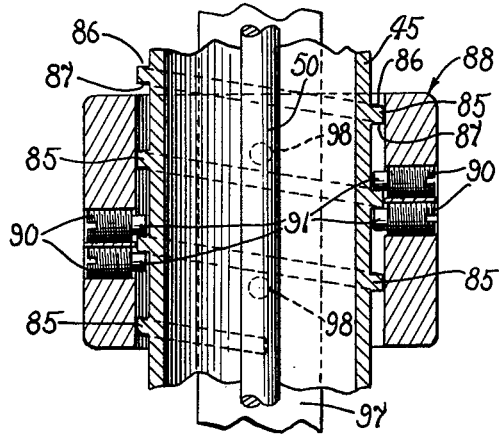

FIG. 10 is a somewhat enlarged vertical section taken on lines 10—10 of FIG. 9.

Referring more particularly to the drawings, the valve of the present invention is indicated generally at 10 having a substantially cylindrical hollow casing 11 which is constructed of a cementitious material such as concrete of the type that is employed in conventional irrigation supply lines. The casing includes an inlet end 12, an outlet end 14, and a radially upwardly disposed opening 15 intermediate the ends. The inner circumference of the hollow casing circumscribes opposite facing ends 16 and 17 of an irrigating conduit having a section removed therefrom to permit entry of the casing. The corresponding ends of the casing and the conduit are joined in fluid-tight relation by a suitable bonding material, such as cement, indicated at 18. A partition 20 of cementitious material is formed transversely of the hollow casing intermediate the ends thereof closely adjacent to the opening 15. The partition includes opposite substantially parallel side surfaces 21 and 22 facing the opposite ends 12 and 14, respectively, of the casing. A substantially oval shaped port 25 extends through the partition providing communication between the inlet and outlet ends of the casing. It is noted that the partition may be either cast integrally with the casing or formed therein just prior to installing the valve in the conduit. In the latter case, the valve may be custom formed for each installation.

A convenient method of formation is to position a length of concrete pipe 11 on end after having cut the radial opening 15 therethrough. Sand is poured into the casing until its upper level is adjacent to the opening and a layer of concrete poured on top of the sand to form the partition 20.

A guide member 30 of rigid material is mounted on the inlet side 21 of the partition and preferably has portions embedded in the partition during the construction thereof so that during the curing process the guide adheres to and is permanently affixed to the partition. The guide provides a continuous oval shaped flange 32 which conforms to the inner surface of the port 25 through the partition. As best shown in FIGS. 3 and 4, the guide includes opposite transverse straight sides 33 and upper and lower arcuate ends 35 and 36, respectively. The sides provide oppositely spaced substantially parallel flange members 37 which define opposite inwardly opening vertically extended, substantially parallel channels 38 therein. A pair of spaced vertically disposed ribs 39 are formed in the guide from the upper arcuate end 35 to a position short of the oval flange 32 for imparting rigidity to the guide.

A gate 40 having opposite substantially parallel side edges 42, is received within the channels 38 of the guide for reciprocal rectilinear movement toward and from the opening 15 in the casing 11. The gate is constructed of a flexible fluid impervious material, such as sheet metal, and includes opposite upper and lower edges 43 and 44, respectively, which are arcuately shaped to conform to the hollow inner circumference of the casing and to cover the oval port 25 through the partition 20.

A tubular vent pipe 45 having a lower flanged end 46 rigidly secured, as by cementing, to the casing 11, is radially upwardly extended therefrom in registry with the opening 15 within the casing. For adjustability and ease of assembly, the tubular vent pipe includes an upper section 47 connected thereto by a pipe coupling 48 and having an open upper outer end spaced from the casing a predetermined distance sufficient to support a column of fluid corresponding to the maximum pressure which is anticipated within the system without overflow from the vent pipe.

With particular reference to FIG. 1, the upper section 47 of the vent pipe 45 preferably mounts a calibrated scale 49 for a purpose soon to be described. An elongated push-pull rod 50 is loosely received within the vent pipe and provides a lower end 51 which is rigidly secured to the gate 40. The rod provides an upper end 52 which is outwardly extended from the vent pipe. An inverted substantially L-shaped arm 55 is pivotally connected to the upper end 52 of the rod. The arm provides a depending portion 56 extending in spaced substantially parallel relation along the vent pipe. A pointer member 58 is rigidly secured to the depending portion 56 of the arm in indicating relation to the calibrated scale 49 on the upper section 47 of the vent. It will be evident that the upper end 52 of the rod 50 may be provided with any desired scale or indicia which by reference to the upper end of the pipe 45 can be utilized to determine gate position.

An annular collar 60 is adjustably mounted on the vent pipe 45 by a thumbscrew 61 screw-threadably mounted therein which frictionally engages the outer periphery of the vent pipe. A control lever 65 having a handle end 66 and a connecting end 67, is pivotally mounted adjacent to the latter end on the collar 60 by a pin 68. The connecting end 67 is pivotally connected to the lower end of the depending portion 56 of the arm 55. From the structure described so far it is apparent that with downward movement of the control handle 66, the upper end 52 of the push-pull rod 50 is upwardly outwardly displaced from the upper section 47 of the vent pipe 45 to slide the gate 40 relative to the guide member 30 so as to open the port 25 in the valve. The extent of such or opposite movement is accurately indicated by the pointer 58 upon the calibrated scale 49. It is also noted that the described mechanism for motivating the rod and gate is disposed completely out of the water which substantially minimizes the formation of rust, corrosion and wear by sand in the water which contributes to the difficulty in operating conventional valves of this type.

A second form of the gate position indicator is disclosed in FIG. 6. In this form a segment 70 of substantially rigid sheet material is rigidly mounted on the collar 60 by a pair of threaded screws 71 and provides an arcuately graduated scale 72 radiated from the pivot pin 68. The scale thereby provides visual indication of the movement of the gate 40 within the valve by the position of the control lever 65 thereon. This form is particularly suited to such installations in which the height of the standpipe is such that convenient visual reference cannot be made to the scale 49.

With particular reference to FIG. 7, a second form of the present invention is provided which enables the valve to be installed completely under the ground, the surface of which is indicated at 73. In this form, the open upper section 47 of the vent pipe 45, which served as a vent in the first form, is removed to permit the utilization of a fluid-tight packing gland arrangement indicated at 74 which is adapted to preclude leakage from around the rod. The gland provides a pipe bushing 75 which is screw-threadably received within the coupling 48 mounted on the vent pipe 45. A close nipple 76 is screw-threadably mounted within the bushing in endwardly upwardly extended relation thereto to slidably receive the rod 50 and prevent lateral movement thereof. A pipe cap 77, having a centrally located bore 78 therein circumscribing the rod, is screw-threadably mounted on the nipple 76. A packing ring 79 is interposed between the cap and nipple about the rod to prevent leakage from the vent pipe 45. A T-handle 80 is mounted on the outer end of the rod extended above the ground for ready access in manipulating the rod and valve gate 40. This form of the present invention is particularly adaptable in installations where the height of the vent pipe 45 of the first form is objectionable. In the presently described form only the T-handle 80 is visible above the ground surface 73. Of course, even the T-handle may be recessed in the ground by the provision of a suitable "dry well" therefor, not shown, in which event none of the valve or its control mechanism need be exposed above ground surface.

A second form of the gate positioning control is shown in FIGS. 8 through 10 adapted to the vented first form of the present invention. In this form the upper end 47 of the vent is provided with an external helical bead 85 having upper and lower surfaces 86 and 87, respectively, about which is positioned an annular ring 88. A plurality of radially disposed setscrews 90 are mounted within the ring and provide inner ends 91 which slidably engage the upper and lower surfaces of the bead. A substantially U-shaped control member 95 having a central substantially horizontally disposed central portion 96 and a pair of opposite depending legs 97 extended therefrom, is disposed about the upper end 47 of the vent pipe. The opposite legs 97 are secured, as by capscrews 98, to the outer periphery of the annular ring 98 and provide a pair of opposite radially outwardly disposed handles 99. As before, the outer end of the push-pull rod 50 extends upwardly outwardly of the open upper end 47 of the vent pipe which in this form is rotatably connected at 100 to the central portion 96 of the control member. Upon rotation of the control member 95, the inner ends of the setscrews engage the bead and cause the ring 88 to be axially displaced upon the vent pipe. Such action is transmitted through the connection 100 to the push-pull rod 50 which positions the gate 40 rectilinearly within the valve.

*Operation*

The operation of the described embodiments of the subject invention is believed to be clearly apparent and is briefly summarized at this point. When it is desired to control the flow of fluid through any of the main or branch lines of an irrigating system, a section of such line is removed and the valve casing 11 substituted therefor. The opposite ends 16 and 17 of the severed conduit are received within the ends 12 and 14 of the hollow casing with such connections being cemented by a suitable bonding material to retain the casing in the proper position with the vented opening 15 upwardly extended therefrom. A vent pipe 45 of a length so that the upper open end of the upper section 47 is disposed above the anticipated fluid level is then cemented to the casing in registry with the opening 15 of the casing.

During use, water is directed from the supply conduit 16 through the inlet 12 of the valve and against the gate 40 blocking the port 25 therein. Such arrangement insures the maintenance of an effective seal between the gate and the partition. With the gate blocking the flow through the valve a column of water is disposed within the vent pipe to a height corresponding to the maximum pressure developed within the system. In opening the valve, downward movement of the control lever 65 is translated through the arm 55 and the rod 50 to raise the gate 40 an amount proportional to the lever movement indicated by the pointer 58 upon the calibrated scale 49. When the scale 72 is utilized, it similarly indicates gate valve adjustment. The scales 49 and 72 are preferably calibrated in units indicating fractional extent of valve opening.

The second form of the control handle, as shown in FIGS. 8 through 10 is similar to that previously described except that with such device rotary movement of the control member 85 is utilized and is converted by axial movement of the ring 88 upon the helical bead 85 to rectilinear movement of the push-pull rod 50, as before.

From the foregoing it is readily apparent that the valve of the present invention is suited to convenient and easy installation in existing as well as new systems. In both forms, the valve portion of the device is disposed completely underground. While the first form of the present invention employs an upwardly extended ventpipe for simplicity of installation and maintenance, such could be removed if desired and substituted with the packing gland 74 of the second form. The control handle 80 is thereby located regardless of pressure in the system, closely adjacent to the ground. Also, either form of the valve may be readily installed in individual branch conduits which in the past has not been economically feasible with conventional standpipe and valve devices. Further, the described gate motivated control mechanisms of the present invention are all disposed outwardly of the water as opposed to conventional designs which are immersed therein and subjected to rust, corrosion and abrasive or valve jamming impurities. It is estimated that the structure of the present invention can be manufactured and sold for as little as one-twentieth the cost of conventional standpipes and globe valves.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention and what I claim as new and desire to secure by Letters Patent is:

1. A valve comprising a casing having a tubular fluid conducting portion being substantially circular in cross section and having a longitudinal axis, a partition in the casing disposed transversely thereof in a plane substantially normal to the axis of the fluid conducting portion providing an oval-shaped port therethrough having a major axis right angularly related to a diameter of the fluid conducting portion and disposed entirely between the center of the fluid conducting portion of the casing and its periphery, an oval-shaped gate having a major axis and being adapted to seat in said port, and means slidably mounting the gate on the partition with its major axis parallel to the major axis of the port for reciprocal adjustment along said diameter of the fluid conducting portion of the casing between a position seated in the port and a retracted position disposed within said tubular portion of the casing opposite to the center of the fluid conducting portion from the port.

2. A valve comprising a casing having a tubular fluid conducting portion which is substantially circular in cross section and which has a longitudinal axis; a partition in the casing disposed transversely thereof having an oval port therethrough circumscribed by an oval seat disposed in a plane normal to the longitudinal axis of the fluid conducting portion and having right angularly related major and minor axes, the minor axis of the seat lying on a predetermined diameter of said fluid conducting portion and the port and seat being disposed between the center of the fluid conducting portion and its periphery; an oval-shaped gate adapted to engage the seat in closing relation thereto having right angularly related major and minor axes; means mounting the gate with its major axis substantially parallel to the major axis of the seat for adjustable positioning along said predetermined diameter of the fluid conducting portion between a closed position engaging the seat and a retracted position disposed opposite to the center of the fluid conducting portion from the seat, said gate having an edge which conforms to the fluid conducting portion when in closed position and an opposite edge which conforms to said fluid conducting portion when in retracted position; and means connected to the gate operable from exteriorly of the casing connected to the gate adjustable to position the gate between said open and retracted positions.

3. A valve comprising a casing having a substantially cylindrical fluid conducting portion and providing a laterally disposed opening; a partition in the casing disposed transversely thereof adjacent to said opening having an oval port therethrough circumscribed by an oval seat disposed in a plane normal to the longitudinal axis of the fluid conducting portion and having right angularly related major and minor axes, the minor axis of the seat lying on a predetermined diameter of said fluid conducting portion and the port and seat being disposed between the center of the fluid conducting portion and its periphery; an oval-shaped gate adapted to engage the seat in closing relation thereto having right angularly related major and minor axes; means mounting the gate with its major axis substantially parallel to the major axis of the seat for adjustable positioning along said predetermined diameter of the fluid conducting portion between a closed position engaging the seat and a retracted position disposed opposite to the center of the fluid conducting portion from the seat, said gate having an arcuate edge which conforms to the fluid conducting portion when in closed position, an arcuate opposite edge which conforms to said fluid conducting portion when in retracted position, substantially parallel opposite side edges, and being of a width measured along its mior axis substantially equal to the radius of the fluid conducting portion, the mounting means including a pair of parallel guide members having channels slidably receiving the side edges of the gate; and a control member connected to the gate extended through the opening in substantially right angular relation to the axis of the fluid conducting portion for manipulation externally of the casing.

References Cited in the file of this patent

UNITED STATES PATENTS

| | | |
|---|---|---|
| 47,073 | Warner | Mar. 28, 1865 |
| 572,842 | Towne | Dec. 8, 1896 |
| 1,186,627 | Wade | June 13, 1916 |
| 1,352,929 | Tucker | Sept. 14, 1920 |
| 1,578,695 | Westrid | Mar. 30, 1926 |
| 1,752,456 | Pillatt | Apr. 1, 1930 |